United States Patent
Ferrero

(10) Patent No.: US 8,132,784 B2
(45) Date of Patent: Mar. 13, 2012

(54) FIXING SYSTEM AND JOINT, FOR FIXING AN ACTUATOR TO A VALVE

(75) Inventor: Riccardo Ferrero, Farigliano (IT)

(73) Assignee: Ferrero Rubinetterie S.R.L., Farigliano (Cuneo) (IT)

(*) Notice: Subject to any disclaimer, the term of this patent is extended or adjusted under 35 U.S.C. 154(b) by 1070 days.

(21) Appl. No.: 12/063,188

(22) PCT Filed: Aug. 7, 2006

(86) PCT No.: PCT/IB2006/052724
§ 371 (c)(1),
(2), (4) Date: Feb. 7, 2008

(87) PCT Pub. No.: WO2007/017832
PCT Pub. Date: Feb. 15, 2007

(65) Prior Publication Data
US 2010/0163773 A1   Jul. 1, 2010

(30) Foreign Application Priority Data
Aug. 8, 2005   (IT) ............... TO2005A0567

(51) Int. Cl.
*F16K 51/00* (2006.01)
(52) U.S. Cl. .... 251/214; 251/291; 251/292; 251/315.01
(58) Field of Classification Search .............. 251/214, 251/291, 292, 315.01
See application file for complete search history.

(56) References Cited

U.S. PATENT DOCUMENTS

| 1,538,912 | A | * | 5/1925 | Taylor | 251/217 |
| 4,450,856 | A | * | 5/1984 | Kocher | 137/315.4 |
| 4,634,099 | A | * | 1/1987 | Danko et al. | 251/335.3 |
| 5,316,319 | A | * | 5/1994 | Suggs | 277/308 |
| 5,954,088 | A | * | 9/1999 | Huang | 137/315.21 |
| 6,014,984 | A | * | 1/2000 | Schmitz et al. | 137/315.01 |
| 6,557,825 | B2 | * | 5/2003 | Stone et al. | 251/152 |
| 6,629,683 | B2 | * | 10/2003 | Wang | 251/315.1 |
| 6,880,806 | B2 | * | 4/2005 | Haikawa et al. | 251/292 |
| 6,886,805 | B2 | * | 5/2005 | McCarty | 251/214 |
| 6,935,615 | B2 | * | 8/2005 | McCarty | 251/214 |
| 2003/0127619 | A1 | * | 7/2003 | Wang | 251/214 |
| 2007/0215213 | A1 | * | 9/2007 | Fox | 137/383 |

FOREIGN PATENT DOCUMENTS

| CN | 1412464 A | 4/2003 |
| DE | 44 19 425 A1 | 12/1995 |
| EP | 1 031 778 A2 | 8/2000 |
| EP | 1 174 651 A2 | 1/2002 |

* cited by examiner

*Primary Examiner* — John Bastianelli
(74) *Attorney, Agent, or Firm* — Sughrue Mion, PLLC

(57) ABSTRACT

An actuator (1) is fixed on a valve (2) through a fixing joint (3) which comprises a tubular sleeve (32) on which a tightening nut (30) is screwed; the nut (30) and the sleeve (32) are provided with a conical thread connection (34, 300); by screwing the nut (30), a plurality of longitudinal prolongations (40), arranged in a crown around the axis of the sleeve (32), tightens on a fixing head (20) of the valve (2), firmly fixing the actuator (1) to the valve (2); the joint at issue provides an alternative to a flange connection, equally solid and resistant to unscrewing due to vibrations; by resting against a mechanical stop surface (24) the nut (30), being unscrewed, can act as an extractor that easily removes the joint (3) from the head (20).

17 Claims, 4 Drawing Sheets

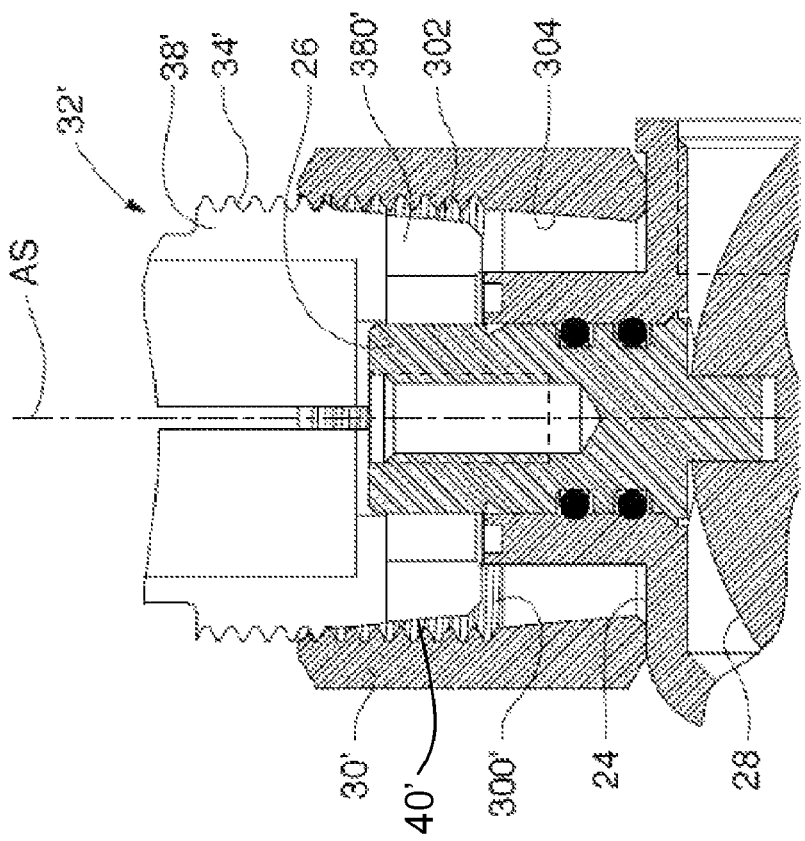
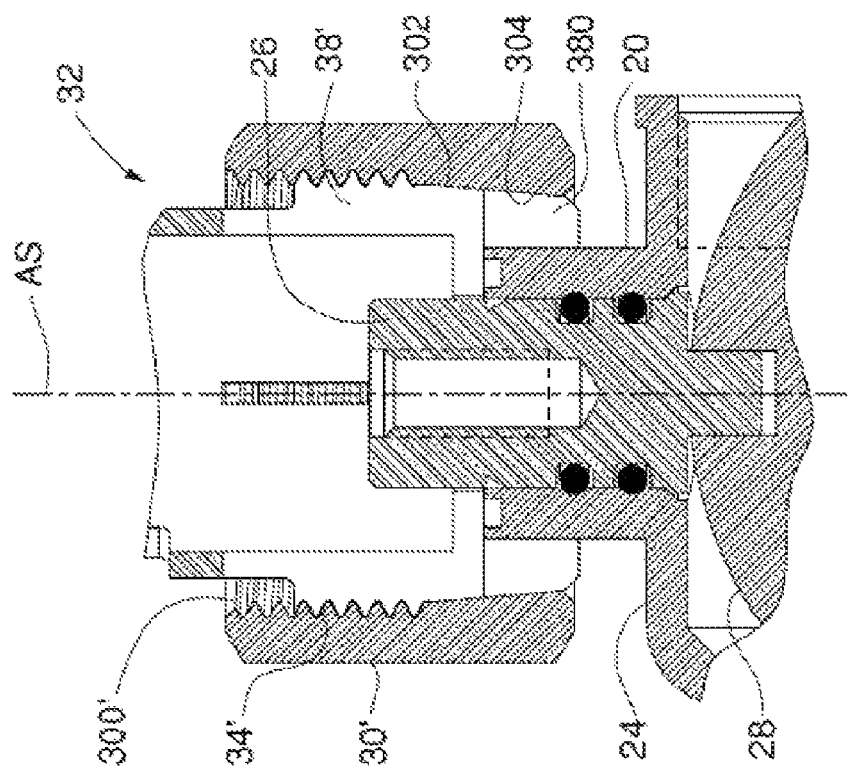

FIXING SYSTEM AND JOINT, FOR FIXING AN ACTUATOR TO A VALVE

FIELD OF THE INVENTION

The present invention relates to a system for fixing an actuator to a valve, that can be used for instance for valves of the kind having a rotary closing member and used in distribution systems of fluids such as water, air or gas, or used for instance in the industrial or agricultural field in distribution systems of feedstuffs or other materials in the form of powders, grains or pellets.

The present invention relates moreover to a fixing joint for fixing an actuator to a valve of the aforesaid type.

BACKGROUND ART

Currently it is known manufacturing rotary valves, of the type to be used for instance in the distribution networks of fluids or substances in powder, grains or pellets, both with manual drive and motorized drive.

In the valves of the first type, a rotary closing member manually driven acting for instance on a drive lever. In the valves of the second type the rotary closing member is driven for instance by an electric motor or by a pneumatic or hydraulic actuator.

The document DE 44 19 425 A1 describes a fixing system that allows to mount easily on a valve body both a manual drive lever and a motorized drive actuator. The (rotary electric motor) actuator is fixed on the valve body by means of two clamps. An advantage of such system is that of allowing a substantial reduction of the supplies, since replacing the lever of a manual tap and mounting the electromechanical actuator on the output shaft of the ball closing member is relatively easy.

However currently, for producing motorized ball taps and—valves, the majority of manufacturers is steered into flange systems, for fixing the actuator to the valve body. An example of fixing of an actuator to the relative valve body through flange is described for instance in the document EP 1 031 778. According to such document the valve body provides a fixing flange integral with the body itself. On such flange a motorized actuator can be fixed. Alternatively the valve can be manually driven by means of a lever.

Therefore, an object of the present invention is providing a fixing system of a motorized actuator that does not require a fixing flange made integrally on the valve body.

SUMMARY OF THE INVENTION

In a first aspect of the present invention, this object is achieved with a system for fixing an actuator to a valve, having a valve that, in its turn, has a valve body defining inside itself a fluid passing duct; a closing member arranged for opening and closing the fluid passing duct; a fixing joint arranged for fixing an actuator to the valve, so as to allow the closing member of the valve to be driven at least by the actuator. At least one of the valve and of the fixing joint has a fixing head, and the other of the valve and the fixing joint has a collar having a substantially tubular shape and defining, at a free end thereof, a fitting seat arranged for contracting and expanding itself, and for being fitted on the fixing head so as to be fixed on it; and a blocking element fitted on the collar and arranged for contracting and expanding the fitting seat thereof by moving relative to the collar itself, so as to fix the collar on the fixing head.

In a second aspect of the present invention, this object is achieved with a fixing joint having a joint housing that in turn has a first connecting interface through which the housing can reversibly be fixed to the valve. The first connecting interface has a collar having a substantially tubular shape defining, at a free end thereof, a fitting seat arranged for contracting and expanding itself and for being fitted on the fixing head of the valve so as to be fixed on the latter; a blocking element fitted on the collar and arranged for contracting and expanding the fitting seat thereof by moving relative to the collar itself, so as to fix the collar to the valve; a second connecting interface through which the joint housing can be reversibly fixed to the actuator; and a connection shaft arranged in the joint housing so as to be rotatable relative to it around a rotation axis, so as to drive the closing member of the valve.

With the present invention a motorized actuator can be fixed to a valve quite firmly and with robustness comparable with a fixing flange of known type.

Further advantages achievable with the present invention will appear more clear, to the technician skilled in the field, from the following detailed description of some particular and non-limiting preferred embodiments, shown in the following schematic figures.

LIST OF FIGURES

FIG. 4 shows a first longitudinal cross-sectioned view, of a joint for fixing an actuator to a valve body according to a second embodiment of the present invention, wherein the joint is in a blocking condition;

FIG. 5 shows a second longitudinal cross-sectioned view of the joint of FIG. 4, wherein the joint is in an unblocked and extraction condition;

DETAILED DESCRIPTION

Figure 1:
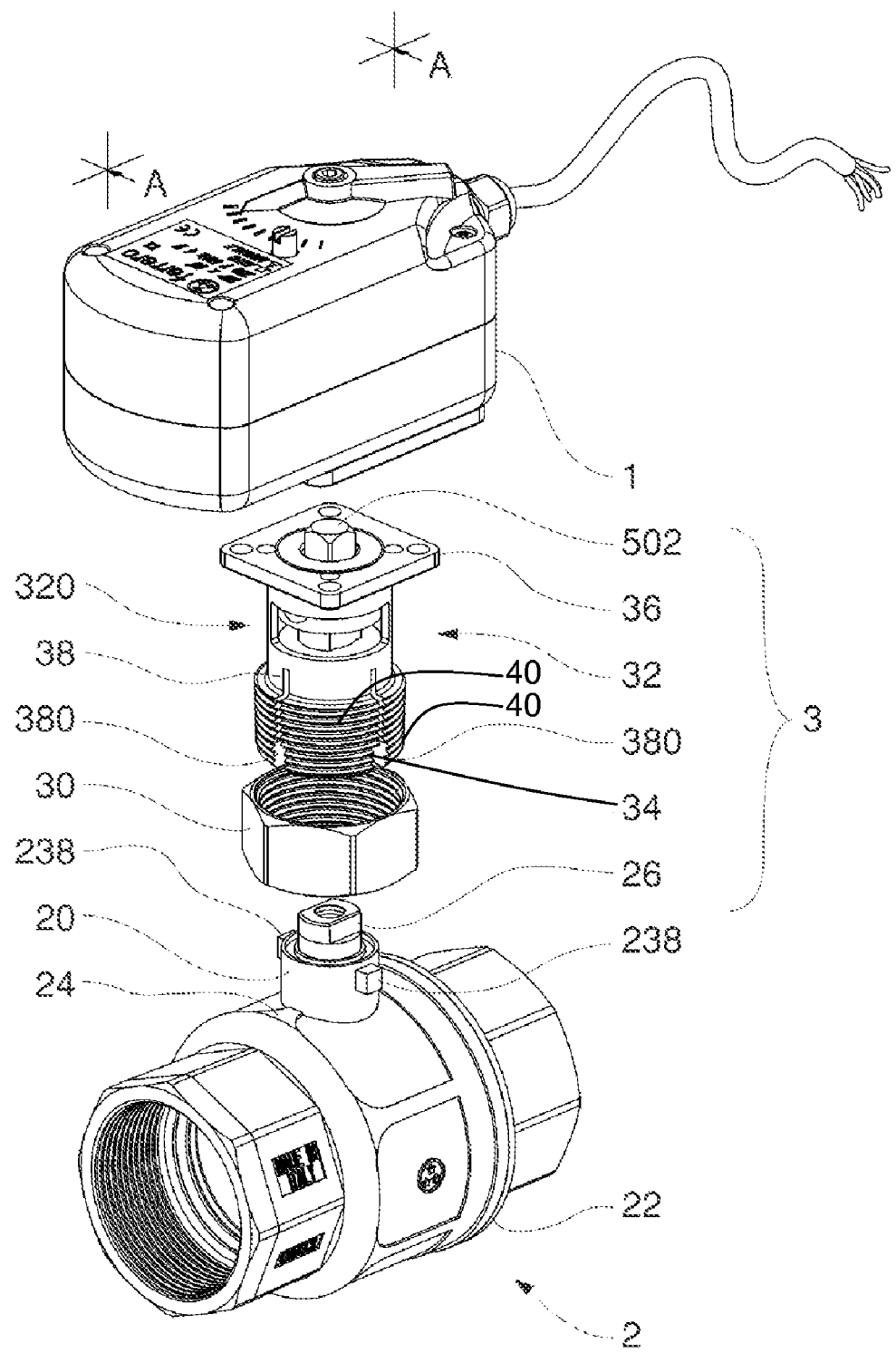
FIG. 1 shows a partially exploded perspective view of an assembly made up of a rotary closing member valve and of the relative actuator according to a first preferred embodiment of the present invention.
Figure 3:
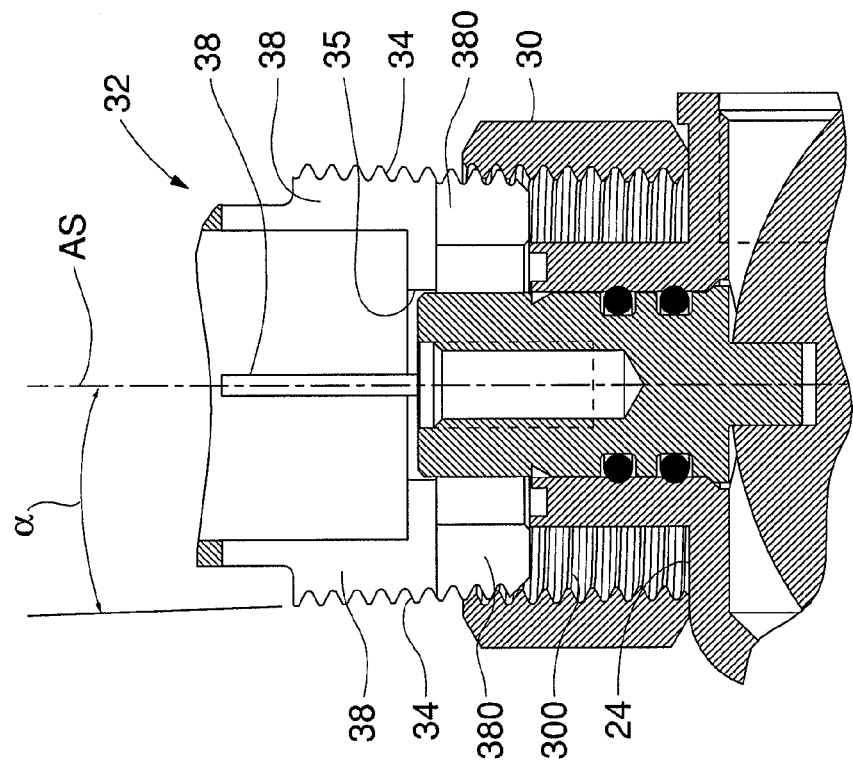
FIG. 3 shows a second cross-sectioned view, according to the longitudinal cross-section plan A-A, of the joint for fixing the actuator to the valve body of the assembly of FIG. 1, wherein the joint is in an unblocked and extraction condition.
Figure 2:
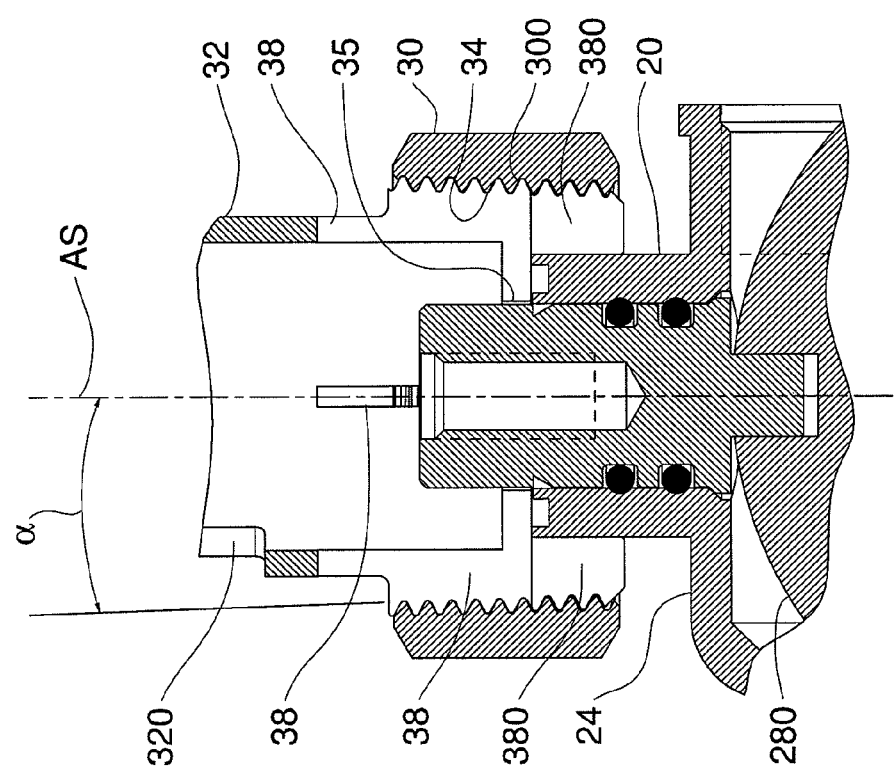
FIG. 2 shows a first cross-sectioned view, according to the longitudinal cross-section plane A-A, of the joint for fixing the actuator to the valve body of the assembly of FIG. 1, wherein the joint is in a blocking condition.

FIGS. 1-3 relate to a first preferred embodiment of a fixing system according to the present invention, wherein the actuator 1—made up of a rotary electric motor and a reduction gear, not shown—is connected to a valve 2 through a fixing joint 3. Such fixing joint 3 comprises a tightening nut 30—for instance a hexagonal one—arranged for being screwed on the threaded male portion 34 of a tubular sleeve 32 thanks to the inner threaded portion 300.

Such tubular sleeve 32 can be fixed, at a first end thereof, to the electrical actuator 1 through the fixing flange 36. The tubular sleeve 32 is fixed to its other end on the valve 2 by fitting it on a fixing head 20 of suitable shape—such as a more or less cylindrical or prismatic shape, or such as a male protrusion having still another shape—and made on the outer body or housing 22 of the valve 2 (FIG. 2).

In the present preferred embodiment the lower end of the sleeve 32 is provided with a plurality of longitudinal tongues or prolongations 40 arranged in a crown around the axis of the sleeve itself and separated by a plurality of longitudinal cuts 38 (FIG. 1), and the threaded zones 34 and 300 of the tubular sleeve 32 and of the tightening nut 30 respectively provide conical threads so that the tightening nut 30, when screwed on the sleeve 32, contracts the crown of longitudinal tongues 40 compressing them against the flanks of the fixing head 20 (FIG. 2). In the present preferred embodiment each of the to longitudinal cuts 38 ends with a wider seat 380 (FIG. 1) arranged for housing a radial protrusion 238 made on the fixing head 20. The embedding between the seats 380 and the protrusions 238 prevents—together with the friction forces, when the nut 3 is tightened—the rotation of the sleeve 32 on the head 20, while the removal of the sleeve 32 from the fixing head 20 is prevented in the present example by the friction forces alone.

The system just described allow fixing the actuator 1 to the valve 2 quite strongly and with robustness comparable to a flange fixing of known type.

In other embodiments, not shown, the resistance to removal can be increased by providing suitable male/female coupling zones, ribbings, grooves or other kinds of coupling on the sleeve and on the head 20, or the coupling system between the protrusions 238 and the seats 380 can be absent.

More generally, a system for fixing an actuator to a valve according to a first aspect of the present invention comprises a fixing joint 3 arranged for fixing an actuator 1 to a valve 2, so as to allow the closing member 280 of the valve to be driven at least by the actuator 1, wherein at least one of the valve and the fixing joint comprises a fixing head 20, and the other of the valve and the fixing joint comprises:

a) a collar having a substantially tubular shape and providing, at a first end thereof, a mouth or other fitting seat arranged for contracting and expanding itself, and for being fitted on the fixing head 20 so as to be fixed on it;
  b) a blocking element fitted on the collar and arranged for contracting and expanding its mouth or another fitting seat by moving along the collar itself, so as to to fix the collar on fixing head 20;

wherein the collar can more generally replace the tubular sleeve 32, and the blocking element can more generally terms replace the nut 30 previously described.

Returning to the particular preferred embodiment of FIGS. 2, 3 an internally hollow driving pivot 26 is housed in the fixing head 20 so that, by rotating the driving pivot 26 the ball closing member 28 can be rotated so as to to open and close the valve 2.

Figure 6:
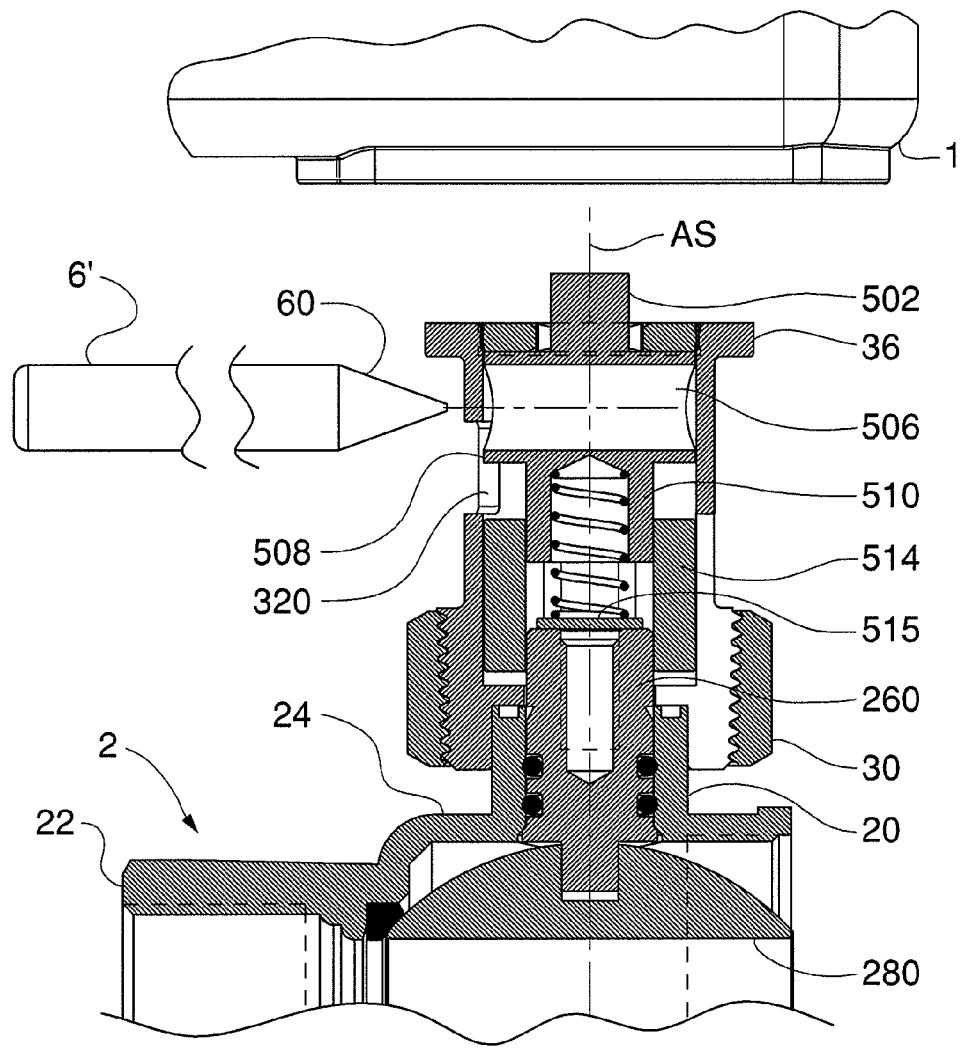
FIG. 6 shows a partially cross-sectioned view according to the section plane A-A, of the assembly of FIG. 1.
Figure 7:
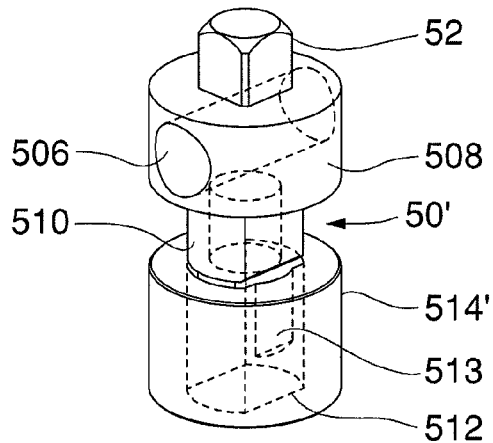
FIG. 7 shows a perspective view of the connection shaft of the assembly of FIG. 1.

The actuator 1 is mechanically connected to the driving pivot 26, so that it can be driven, by means of the connection shaft 50' (FIGS. 6, 7), which is inserted in the tubular sleeve 32 so as to be rotatable engaging with the reduction gear of the actuator 1 through its upper end 502, and engaging themselves with the upper end of the driving pivot 26 through its lower end 512, 514 (FIG. 7).

In the present preferred embodiment (FIGS. 1-3, 6,7) the connection shaft 50' comprises:

a) a displaceable switching element 508 that can slide along the rotation axis AS of the connection shaft 50' itself, so as to reversibly engage and disengage its upper end 502—shaped as a square male plug-with the actuator 1
  b) a lower coupling element 514 engaged, by means of the square cross-section through-hole 512, both with the square male-shaped protrusion 510 of the displaceable switching element 508, and with the upper end 260 of the driving pivot 26.

The displaceable switching element 508 is further provided with a hole 506 in which the drive lever 6' can be inserted, in case of need, so that the rotary closing member 280 of the valve 2 can be driven even in case of failure or lack of feeding of the actuator 1.

Accordingly an opening 320 is provided in the outer wall of the sleeve 32, through which the drive lever 6' can be inserted in order to reach the hole 506.

The displaceable switching element 508 and the lower coupling element 514 are part of a system—more extensively described in a copending patent application filed on the same date and by the same applicant of the present application—for reversibly disconnecting the actuator 1 when the rotary closing member 280 is manually driven with the lever 6'.

Returning to FIGS. 1-3, the reference 35 of FIGS. 2,3 indicates a circular opening through which the driving pivot 26 is inserted, rotatably free.

Advantageously the system for fixing the actuator 1 to the valve 2 comprises a mechanical stop surface 24, in the present embodiment made on the outer body 22 of the valve, against which tightening nut 30 can rest when is unscrewed but its thread 300 is still engaged with the thread 34 of the sleeve 32 (FIG. 3): in this way the nut 30 when unscrewed acts as an extractor and allows an operator to remove easily the sleeve 32 from the fixing head 20 even if these two parts tenaciously welded together due for instance to incrustations, oxidations, rust, dirt or of other undesired factors.

Such undesired welding effects of the connection zones that connect the electrical actuator to the output shaft of the rotary closing member or to the valve body—effects caused for instance by exposure to the atmospheric agents, by a stay in dirty atmospheres or by other environmental conditions—frequently render the maintenance of valves of known type difficult.

If at least one of the female thread 300 of nut 30 and the male thread 34 of the sleeve 32 is a conical thread, the taper angle a of the thread (FIGS. 2,3) has relatively small values, for instance values smaller than 10°, and even more preferably smaller than 4°; in the example shown in FIGS. 2-3, both threads 34 and 300 comply with the Norm UNI ISO 7 and are provided with a taper angle $\alpha$ by approximately 1.43°. Another suitable and particularly advantageous type of thread is the american gas-thread NTP. Other further examples of advantageously suitable threads are the gas-threads BS21 or DIN2999.

The smaller is the taper angle $\alpha$ of threads 34, 300, the greater are the number of turns and the stroke that the tightening nut 30 can perform in order to reach the mechanical stop surface 24 and to remove the sleeve 32 from the head 20 before that the two threads 34 and 300 disconnect one from the other.

Moreover the small taper angles reduce the tendency of the joint to unscrew when undergoing vibrations, making it remarkably reliable.

FIGS. 4,5 relate to a second embodiment of a fixing system according to the present invention. In such embodiment the tubular sleeve 32' and the tightening nut 30' are provided with a thread male portion 34' and with a thread female portion 300' providing conical threads instead of cylindrical threads. In this preferred embodiment too the lower end of the sleeve 32' is provided with a plurality of longitudinal tongues or prolongations 40' arranged in a crown around the axis of the sleeve itself and separated by a plurality of longitudinal cuts 38' (FIGS. 4, 5).

The lower end of the sleeve 32' and the tightening nut 30' provide moreover two frustumconical or however tapered zones, male 302 and female 304 respective, allowing the crown of longitudinal tongues 40' to contract, compressing the longitudinal tongues 40' against the flanks of the fixing head 20, by screwing the tightening nut 30' on the sleeve 32'. This way the sleeve 32' can be blocked—in the present preferred embodiment, but not necessarily—by friction on the fixing head 20 of the valve 2, and consequently the motorized actuator 1 can be blocked on the valve 2.

In this preferred embodiment too the body of the valve 22 provides a mechanical stop surface 24 against which the tightening nut 30' can rest and press when is unscrewed, even if its female thread 300' is still engaged with the male thread 34' of the sleeve. This way the nut 30', keeping to be unscrewed acts as a mechanical jack and allows the sleeve 32' to be easily removed from the fixing head 20 even with tenacious incrustations and other undesired adhesion forms between the two parts, analogously to what has been previously described.

The preferred embodiments previously described are susceptible of various modifications and variations without departing from the scope of the present invention. For instance the conical thread connection 34, 300 and the one between the surfaces 302 and 304 can be replaced by other kinds of inclined plane coupling. The conical—34, 300 and cylindrical thread connections 34', 300' can moreover be replaced with a suitable cam coupling, that displaces longitudinally the nut or another blocking element 30 along the sleeve or collar 32 when the nut or another blocking element 30 is rotated on the sleeve or collar 32. The hole 506 can be replaced by other elements—for example protrusions, hexagonal sockets, threads—arranged for allowing a drive lever or a drive wrench 6 to be engaged on the shaft 50 and to act with them on the shaft 50 in order to drive the rotary closing member 280. The outer walls of the sleeve 32 can also lack openings 320; in this case the valve 2 can be driven by a motorized actuator, or also manually, acting for instance on the square plug 502 only.

The invention claimed is:

1. System for fixing an actuator to a valve, comprising:
   a valve, the valve comprises:
      a valve body defining inside a fluid passing duct;
      a closing member arranged for opening and closing the fluid passing duct;
   a fixing joint arranged for fixing an actuator to the valve, so as to allow the closing member of the valve to be driven at least by the actuator,
   wherein at least one of the valve and of the fixing joint comprises a fixing head and the other of the valve and the fixing joint comprises:
   a collar having a substantially tubular shape and defining, at a free end thereof, a fitting seat arranged for contracting and expanding, and for being fitted on the fixing head so as to be fixed on the fixing head;
   a blocking element fitted on the collar and arranged for contracting and expanding the fitting seat by moving relative to the collar, so as to fix the collar on the fixing head;
   the fixing joint comprising a connection shaft that is inserted in the collar, is rotatable about a rotation axis and comprises an upper end configured to engage the actuator and a lower end configured to drive the closing member and wherein the collar provides a plurality of prolongations arranged to tighten the collar on the fixing head when the blocking element moves along the collar.

2. System according to claim 1, wherein the blocking element is arranged for moving along the collar, so as to contract the fitting seat, when the blocking element is turned on the collar.

3. System according to claim 1, wherein the collar and the blocking element provide an inclined plane coupling arranged for causing the contraction of the fitting seat of the collar when the blocking element moves along the collar.

4. System according to claim 1, wherein at least some of the prolongations extend in a direction longitudinal to the collar.

5. System according to claim 2, wherein the blocking element is arranged for moving along the collar so as to contract the fitting seat, when the blocking element is rotated on the collar due to one or more coupling systems chosen from the following group: a cam coupling, a cylindrical thread coupling, and a conical thread coupling.

6. System according to claim 5, wherein the conical thread coupling is provided with a taper angle not greater than 10°.

7. System according to claim 6, wherein the conical thread coupling is provided with a taper angle not greater than 4°.

8. System according to claim 1, wherein the blocking element comprises a nut arranged for being screwed on the collar.

9. System according to claim 1, wherein the blocking element provides a cylindrical thread coupling through which the blocking element can be fitted and screwed on the collar and a tapered female seat being part, together with the collar, of the inclined plane coupling, wherein the cylindrical thread coupling and the tapered female seat are arranged in substantially different positions along the collar.

10. System according to claim 1, comprising a mechanical stop surface against which the blocking element can rest when the blocking element moves along the collar so as to expand the fitting seat and the blocking element is still engaged with the collar.

11. System according to claim 5, wherein the blocking element can rest against a mechanical stop surface while being unscrewed from the collar but remain engaged with the collar through the cylindrical or conical thread coupling.

12. System according to claim 1, wherein the valve provides the fixing head, and the fixing joint comprises the collar and the blocking element.

13. Fixing joint for fixing an actuator to a valve provided with a fixing head, wherein the joint comprises:
   a joint housing comprising:
      a first connecting interface through which joint the housing can reversibly be fixed to the valve, wherein the first connecting interface comprises:
         a collar having a substantially tubular shape defining, at a free end thereof, a fitting seat arranged for contracting and expanding and for being fitted on the fixing head of the valve so as to be fixed on the valve;
         a blocking element fitted on the collar and arranged for contracting and expanding the fitting seat by moving relative to the collar, so as to fix the collar to the valve;
      a second connecting interface through which the joint housing can be reversibly fixed to the actuator;
   a connection shaft arranged in the joint housing so as to be rotatable relative to the joint housing around a rotation axis, so as to drive a closing member of the valve; and
   the fixing joint further comprising a connection shaft that is inserted in the collar, is rotatable about the rotation axis and comprises an upper end configured to engage the actuator and a lower end configured to drive the closing member and wherein the collar provides a plurality of prolongations arranged to tighten the collar on the fixing head when the blocking element moves along the collar.

14. Joint according to claim 13, wherein the second connecting interface comprises a fixing flange.

15. Joint according to claim 13, wherein the connection shaft comprises:
   a motor-drive coupling portion, arranged for allowing the shaft to be drive by a motorized actuator;
   a hand-drive coupling portion, arranged for allowing the shaft to be manually driven by one or more of the following tools:
   a drive lever;
   a drive wrench.

16. The system according to claim 1, wherein collar, the blocking element and the connection shaft are coaxial.

17. The joint according to claim 13, wherein collar, the blocking element and the connection shaft are coaxial.

* * * * *